United States Patent [19]
Williams et al.

[11] Patent Number: 5,222,027
[45] Date of Patent: Jun. 22, 1993

[54] INJECTOR COMMUNICATIONS SYSTEM

[75] Inventors: Gary E. Williams, Duluth; Craig A. Hollabaugh, Atlanta, both of Ga.

[73] Assignee: Titan Industries, Inc., Atlanta, Ga.

[21] Appl. No.: 627,851

[22] Filed: Dec. 14, 1990

[51] Int. Cl.$^5$ ............................................. G06F 15/46
[52] U.S. Cl. ........................................ 364/479; 222/1; 222/57; 222/71; 364/172; 364/502; 364/510
[58] Field of Search ............... 364/478, 479, 502, 510, 364/550, 172, 131, 132, 138, 139; 222/1, 19, 16, 57, 71, 639, 52

[56] References Cited

U.S. PATENT DOCUMENTS

| | | | |
|---|---|---|---|
| 4,353,482 | 10/1982 | Tomlinson et al. | 364/479 X |
| 4,538,222 | 8/1985 | Crain et al. | 364/502 X |
| 4,779,186 | 10/1988 | Handke et al. | 364/502 X |
| 4,916,631 | 4/1990 | Crain et al. | 364/502 |

OTHER PUBLICATIONS

Omni-Pak Adcon Brochure, Houston, Tex., Sep. 1989.

Primary Examiner—Joseph Ruggiero
Attorney, Agent, or Firm—James Creighton Wray

[57] ABSTRACT

The present invention relates to a programmable additive controller that provides remote accounting and control of additive injectors. The invention enables remote monitoring and controlling of additive injectors from a host computer. It has statistical performance chart generation for individual additive controllers and correlates additives, products, product loadings and additive used for each injector, terminal lane and product by remote access. It remotely resets alarms and generates files for use on other systems as well as stores data for the entire company, providing company-wide information and control from a single host computer. Communications between each additive controller and the host computer is made through a modem.

3 Claims, 7 Drawing Sheets

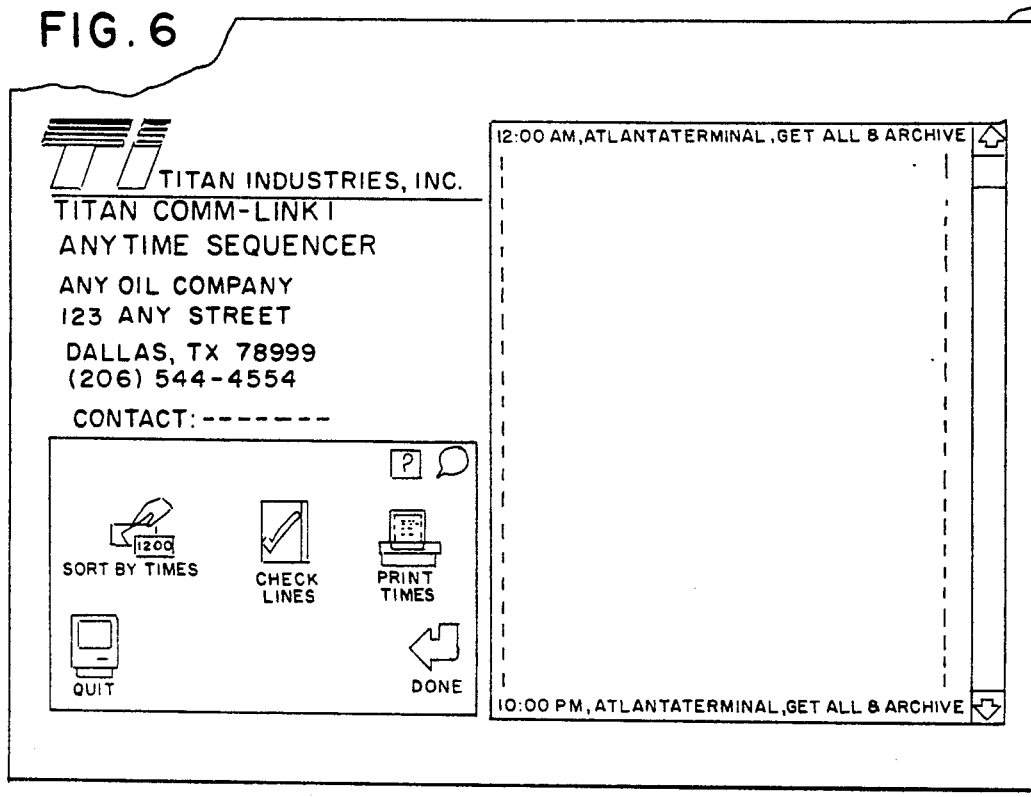
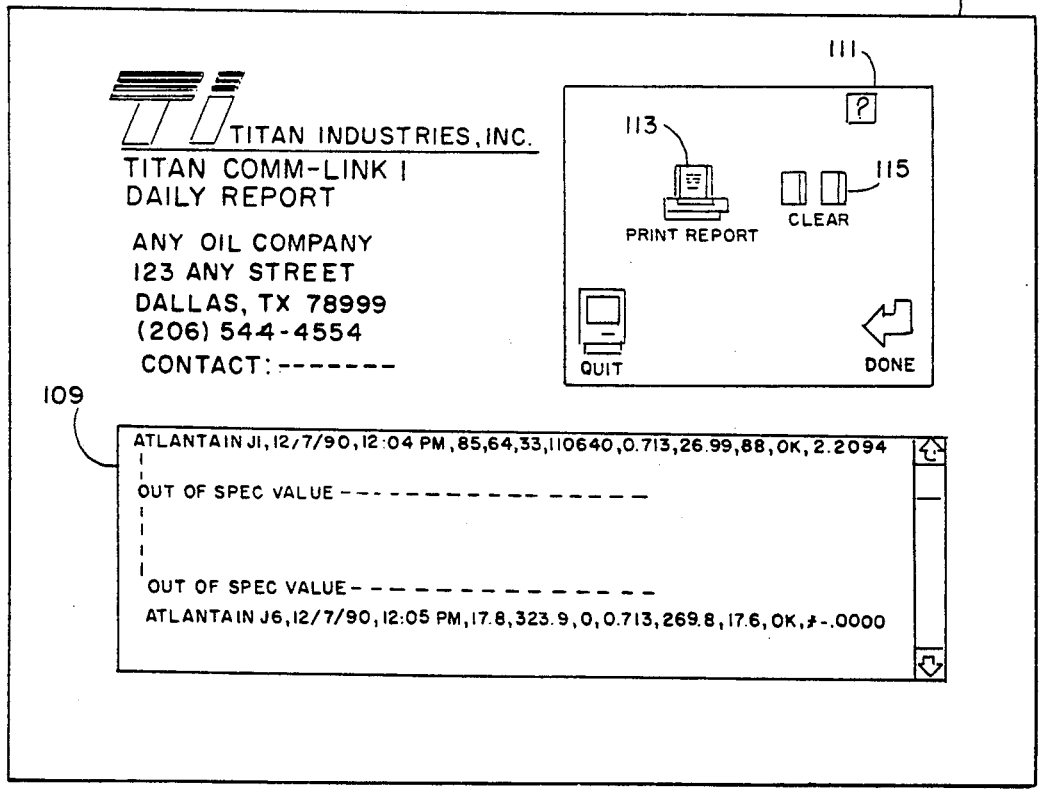

FIG. 10

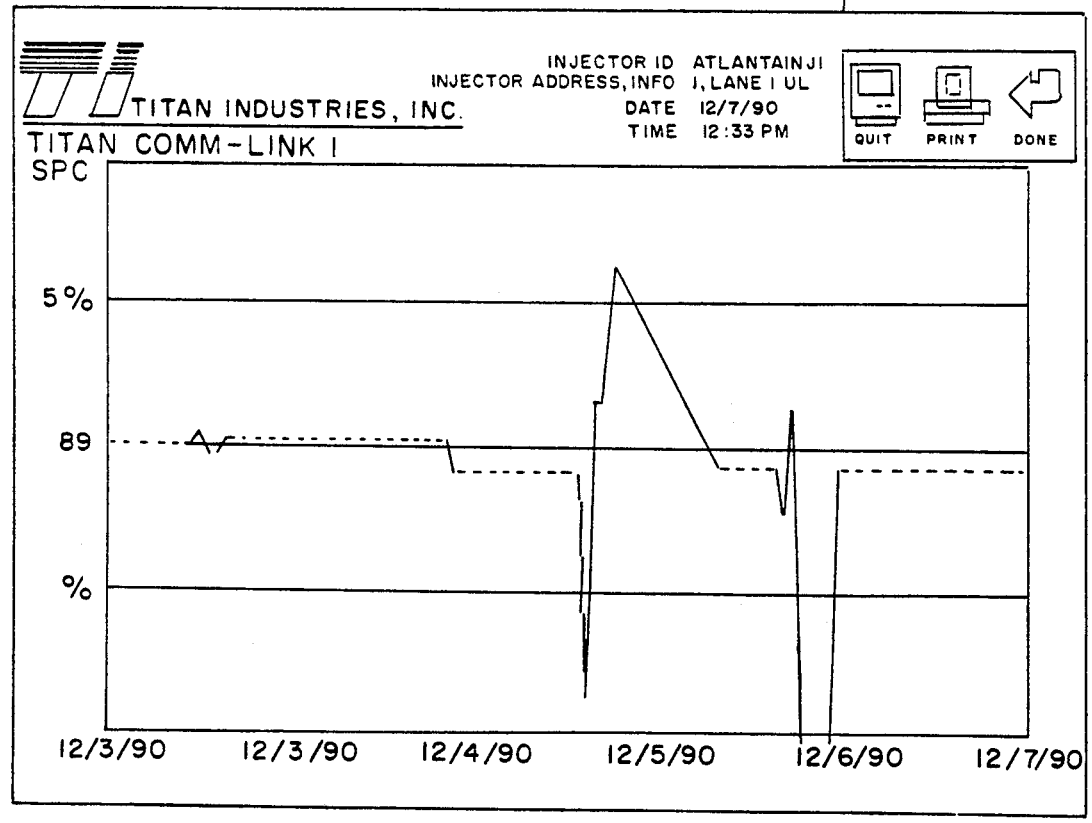

TITAN INDUSTRIES INC.
TITAN COMM-LINK I
INJECTOR DATA

ANY OIL COMPANY
123 ANY STREET
DALLAS, TX 78999
(206) 544-4554
CONTACT: --------

INJECTOR ID   ATLANTAINJI
INJECTOR ADDRESS, INFO   I, LANE I UL
DATE   12/7/90
TIME   12:04 P.M.
BATCH TOTAL (CC)   85
GRAND TOTAL (GAL)   64.33
GAS TOTAL (GAL)   110640
K FACTOR A   0.713
K FACTOR B   26.99
PRESET A (CC)   88
CALL STATUS   OK

VALUE   2.2094
UPPER CONTROL LIM.   5%
TARGET   88cc/40 GAL
LOWER CONTROL LIM   5%

FIG. 11

TITAN INDUSTRIES, INC.
TITAN COMM-LINK I
SPC

INJECTOR ID   ATLANTAINJI
INJECTOR ADDRESS, INFO   I, LANE I UL
DATE   12/7/90
TIME   12:33 PM

INJECTOR COMMUNICATIONS SYSTEM

BACKGROUND OF THE INVENTION

In the chemical industry, particularly in the gasoline industry, problems of long standing exist in the centralized control of additives provided to main product flows. In the example of the gasoline industry, pipelines deliver gasoline from refineries to remote storage areas called terminals. The terminals have gasoline storage facilities and truck loading facilities. Usually each terminal has two or more lanes in multiples of two so that two or more delivery trucks may be simultaneously loaded with gasoline for delivery to retail stations. Each lane usually has three additive controllers for mixing additives into the loading pipes according to predetermined ratios of additives and gasoline. Heretofore additive controllers have used positive displacement pistons for injecting predetermined quantities of the additives to the gasoline. The additive controllers were periodically inspected by terminal personnel, who manually recorded readings and checked operations. The proper ratio of gasoline additiives to gasoline is dependent upon continued operation of reciprocating positive displacement additive controllers, and their inspection and observation by trained terminal personnel.

Problems continue to exist in the control and assuredness of operations and additive ratios, and in the immediate response to malfunctioning additive controllers.

SUMMARY OF THE INVENTION Introduction

The present invention provides remote acoounting and control of additive injectors. The present invention provides a communication system which gives a user a unique ability to monitor and control additive injectors remotely from a host computer.

Remote communications, remote monitoring and control, and the providing of periodic injector status reports, are features of the present invention. This invention also provides auto-dial upon alarm states in individual injectors, and reports by exception from injectors to the host computer.

The invention provides statistical performance chart generation for individual additive controllers, and correlates additives, products, product loadings and additive used for each injector, terminal lane and product. The present invention controls the additive-product ratio for each additive and controller, and remotely resets alarms and generates files which may be used on other systems and stores data for the entire company. One significant feature of the present invention is the ability to remotely program each individual additive controller. Another significant feature is the provision of company-wide information and control from a single host computer. As an example, a major oil company in the United States may separately program additive controllers at each loading lane in each terminal in remote pipeline locations and at or nearby refineries, and obtain data of loadings and additives for all injectors, lanes and terminal systems throughout the United States. The present system stores and archives data and uses standard RS-422 and RS-232 serial communications. Communications between each additive injector and the host computer is made through a modem.

When a driver drives into a lane and fills his truck with three grades of gasoline, three individual additive injectors in each lane are used. Conventionally, each terminal has two lanes and six additive injector controllers are used per terminal. Information about performance of each injector controller is available visually and is provided to a remote host computer. A microprocessor inside each additive injector talks to the host computer via a communications port, which links each injector to a modem and phone line.

The individual microprocessor at the injector stores accounting information over a long period, and has a capacity for a large number of significant digits which keep accounts going for a year or more.

The present system is designed for use with programmable injectors described and claimed in a co-pending application entitled "Programmable Additive Controller" by Gary E. Williams, filed Dec. 7, 1990, now U.S. Pat. No. 5,118,008 issued Jun. 2, 1992. The disclosure of that patent application is incorporated herein by reference.

The programmable additive controller, herein referred to as an injector, is a state-of-the-art, third generation microprocessor-based chemical additive injector panel suitable for a variety of chemical additive injection applications.

The programmable injector microprocessor gathers, monitors, analyzes, controls and displays input data to precisely control and account for chemical additive injection and product deliveries. The microprocessor is a fully programmable solid state computer capable of all monitoring, communicating and controlling functions of the additive injector. All input data to the microprocessor is programmed by the user and by the host computer, and is LED displayed in direct engineering units of cubic centimeters, gallons or liters. The additive injector provides a programmable meter factor adjustment and incorporates an EEPROM 10-year memory system in the event of loss of power. The additive injeotor uses a patented positive displacement flowmeter which is easy to service, highly reliable and accurate within 5/100ths of a percent.

The unit injects a predetermined amount of additive on receipt of a command pulse from a load meter transmitter. 0n receipt of the pulse, the microprocessor energizes a solenoid control valve, thereby allowing pressurized flow of additive through the positive displacement flowmeter. Flow of additive through the flowmeter results in generation of low voltage information pulses from the meter to the microprocessor. Based on programming, each pulse represents a quantum of additive flow through the injector. When the volume of additive injected equals the preprogrammed value entered in the injector, the microprocessor de-energizes the solenoid control valve and stops the injection sequence. The unit then waits for the next command to inject. Typically, commands occur 15 or 20 times a minute.

The additive injector provides a primary and secondary alarm feature, which alerts the host computer and terminal personnel in the event of an alarm condition. The primary alarm is an integral part of the microprocessor and is controlled by accessing the program. The secondary alarm serves as a backup and activates only in the event of failure of the primary alarm. An alarm contact can be used to terminate loading in the event of alarm condition.

The additive injector incorporates a batch averaging feature, which automatically adjusts the next preset to ensure that the correct amount of additive is injected, regardless of changing hydraulic conditions. When the highly accurate flowmeter pulses indicate too little or too much additive has flowed in one cycle, the next preset is increased or reduced by the amount of the discrepancy. That feature enhances the overall accounting and control of the additive injection, thereby ensuring high quality products. The additive injector has three counters. A first stores the preset value. A second counter keeps a cumulative total of additive which has flowed through the flowmeter, and a third counter keeps a cumulative total of command pulses from the load meter, which are directly related to total product flow.

The injector communications systems make the history of these values and their changes available to the host computer periodically and on demand.

The host computer is a dedicated machine designed to facilitate management of remote additive injectors. The computer software of the present invention provides for remote data collection and process control.

A data acquisition computer interface system allows the input of all data from the real world, such as gasoline and additive stocks.

A host computer at the main office sequentially calls each terminal, sequentially queries each additive injector controller in the terminal for information and sets parameters inside each injector controller.

Software in the host computer is established and is modified to provide specific information to specific companies from the controllers through modems and a dedicated telephone line.

The system reports the total operation and plots out performance of individual additive injector controllers in additive per gallon plots and total gallon outputs.

Additive totals and product totals are reconciled daily to ensure the carrying out of prescribed additive treatments. From the database, the computer can generate a statistical performance chart to provide a running history of a specific injector performance. Data points are monitored continuously to ensure each day's injection is within the prescribed control limits. If a particular additive controller does not inject a sufficient quantity, it displays a "HELP" on its local display. The terminal automatically initiates a call to the host computer and informs the host computer that an error has occurred. The host computer polls all injector controllers at the terminal and looks for an alarm state. Upon identifying the particular injector controller, the host computer beeps and alerts an operator and prints out an alarm status page. The host computer may automatically call a terminal operator to inform the terminal operator of the alarm state. The system provides a redundant double-check on each terminal operator, and provides reports of dates and times of "HELP" or error signals for each additive controller.

The user monitors and controls each injector from a host computer at a remote location. This enhanced ability to interact with the injectors directly increases the efficiency and control of additive system operations, and reduces additive system maintenance requirements, such as service calls. Often, problems associated with an injector can be resolved via the remote communications, thus saving the expense of a service call.

These and further and other objects and features of the invention are apparent in the disclosure, which includes the above and ongoing written specification, with the claims and the drawings.

BRIEF DESCRIPTION OF THE DRAWINGS

FIG. 6 is a representative example of a sequencer screen.

FIG. 7 is a representative example of a daily report.

FIG. 10 is a representative example of injector data screen.

FIG. 11 is a representative example of a statistical process control chart.

DETAILED DESCRIPTION OF THE DRAWINGS

Figure 1:
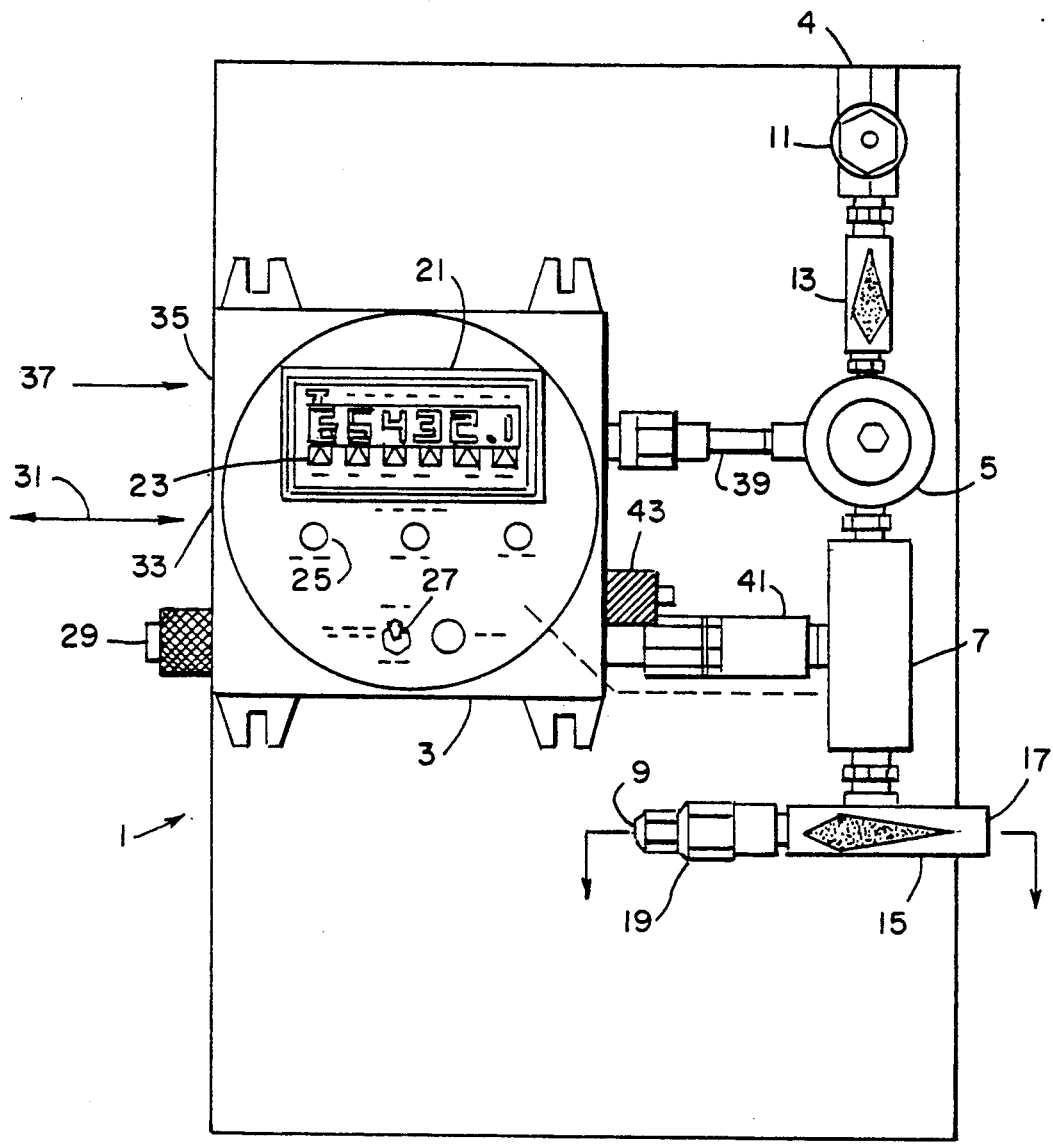
FIG. 1 is a schematic detail of an additive injector controller.

Referring to the drawings, an additive injector is generally indicated by the numeral 1. The injector has a microprocessor 3 which controls a control valve to flow additive from a pressurized source inlet 4 through a flowmeter 7 and out through an outlet 9. A filter 11 filters the additive, and a two-way ball valve 13 permits shut-off of the additive. A three-way ball valve 15 provides flow, either to a test outlet 17 or through a check valve 19 to the outlet 9.

The microprocessor 3 has an LED digital display 21, with local control buttons 23 and lamps 2 which indicate operational status. A switch 27 enables or disables the injector, and a calibration push button and alarm light 29 provides a single command pulse and indicates an alarm condition. An RS-422 low voltage communicator 31 is provided through a port 33. The meter receives 120 VAC power, and an input port 35 receives a command power pulse 37. The command pulse 37 provides a control level over line 39, which holds the solenoid control valve 5 open. Output pulses 41 from flowmeter 7 are related to the turning of rotors in the flowmeter, and are indicative of units of additive passing through the flowmeter 7 and out through the outlet 9. A switch 43 turns the microprocessor off or on for automatic operation.

Figure 2:
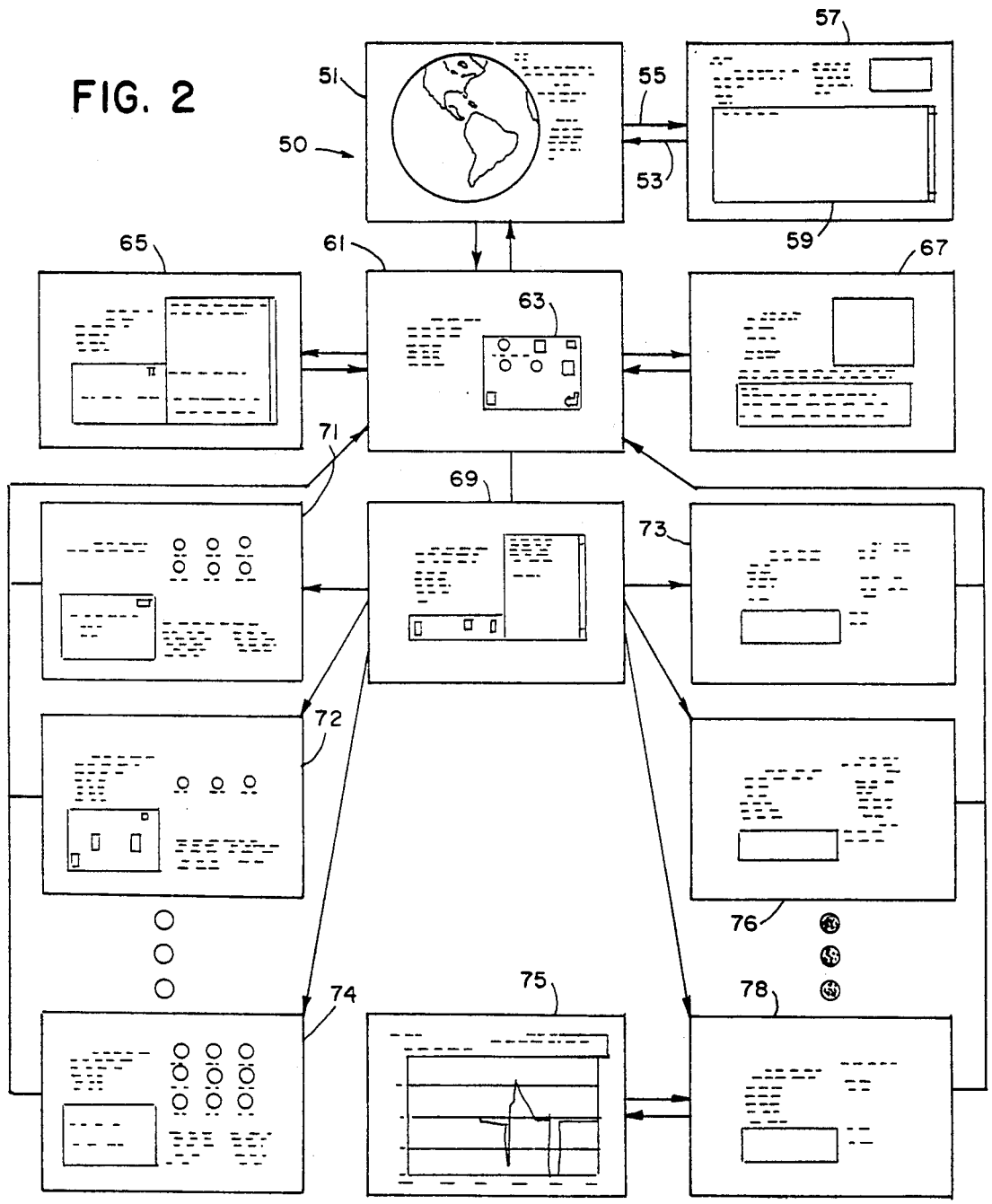
FIG. 2 is a schematic representation of the injector communications system.

Referring to FIG. 2, an injector communications system is generally indicated by the numeral 50 and is described by a sequential series of screens which may appear on the microprocessor. System screen 51 indicates that the system is working. An error in an injector causes an injector to dial up 53 the host computer. The host computer communicates 55 with the terminal, and a screen 57 results. The host computer polls the injectors at the terminal, and the identification 59 of the injector, which is in a "HELP" state, is displayed on the screen 57. The word "HELP" is also displayed on the display 21 shown in FIG. 1.

The injector error arises when the flowmeter 7 has not measured a sufficient quantity of additive to meet the preset A value within a given amount of time. As an example, a control pulse 37 is given for each 40 gallons of gasoline flowing in the product line. One such pulse may be received within a four second time span. A control over line 39 opens valve 5, and the flowmeter measures a predetermined amount of additive, for example, 90 cubic centimeters, for each command pulse. The 90 cubic centimeters is delivered in about one second. If the 90 cubic centimeters is not delivered in two seconds or before the arrival of the next command pulse, an error is noted. If the slow delivery is noted for three successive cycles, the microprocessor 3 goes into an alarm state, resulting in a display of "HELP", a dialing up of the host computer, a polling of injectors at the terminal, and a display of screen 57 at the host computer.

Screen 61 is displayed as an index with selections 63, which may be selected by a mouse and clicker. One of the choices is the sequencer screen 65. Another is the daily report screen 67. Terminal index screen 69 may be selected, and from that screen a particular terminal screen 71 may be selected or an injector data screen 73 may be selected. Alternate terminal control screen 72 or 74 for different terminals may be selected, or alternate injector screens 76 or 78 for different injectors may be selected. From any one of the injector screens, a performance chart 75 may be selected for printing.

Figure 3:
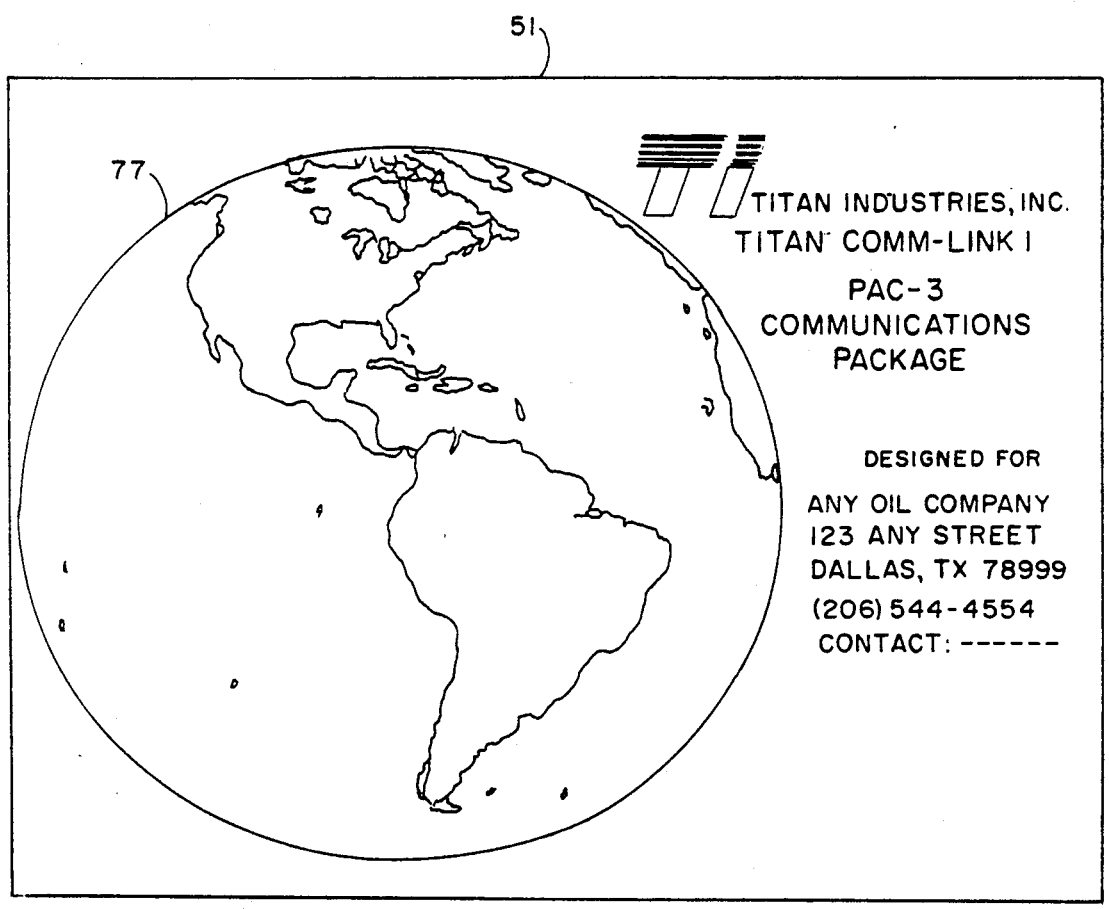
FIG. 3 is a detail of the communications system lead screen.
Figure 4:
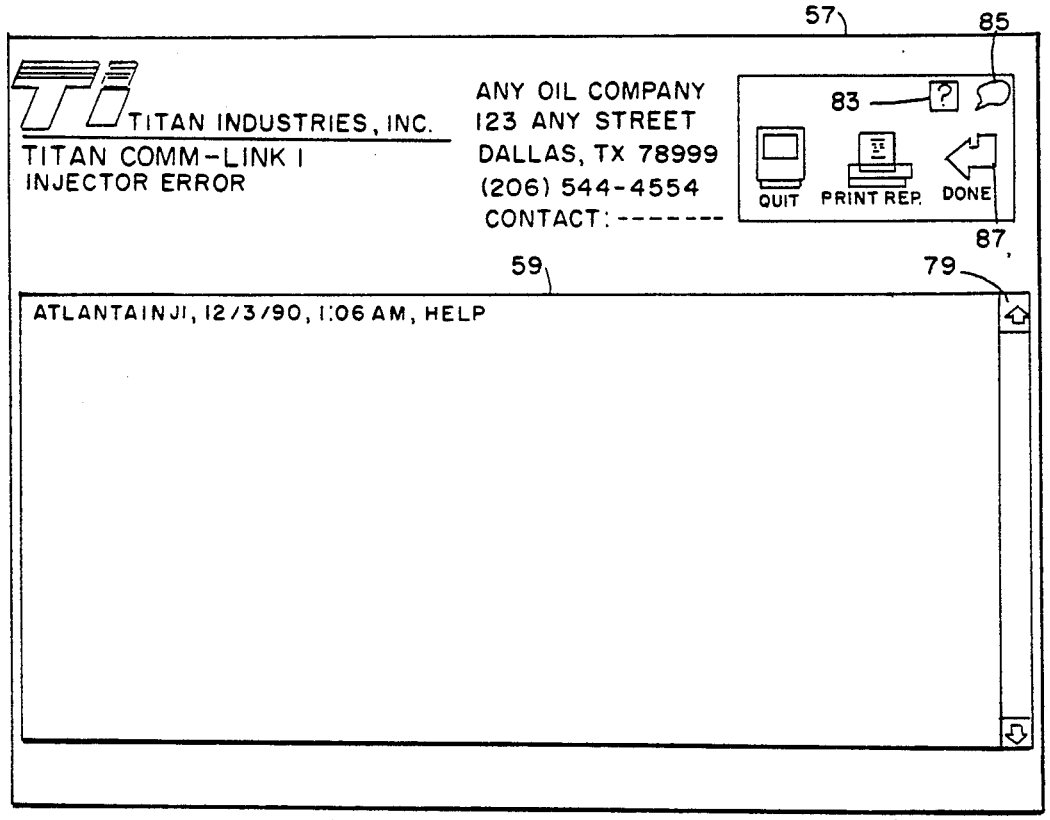
FIG. 4 is a detail of an injector error screen.
Figure 5:
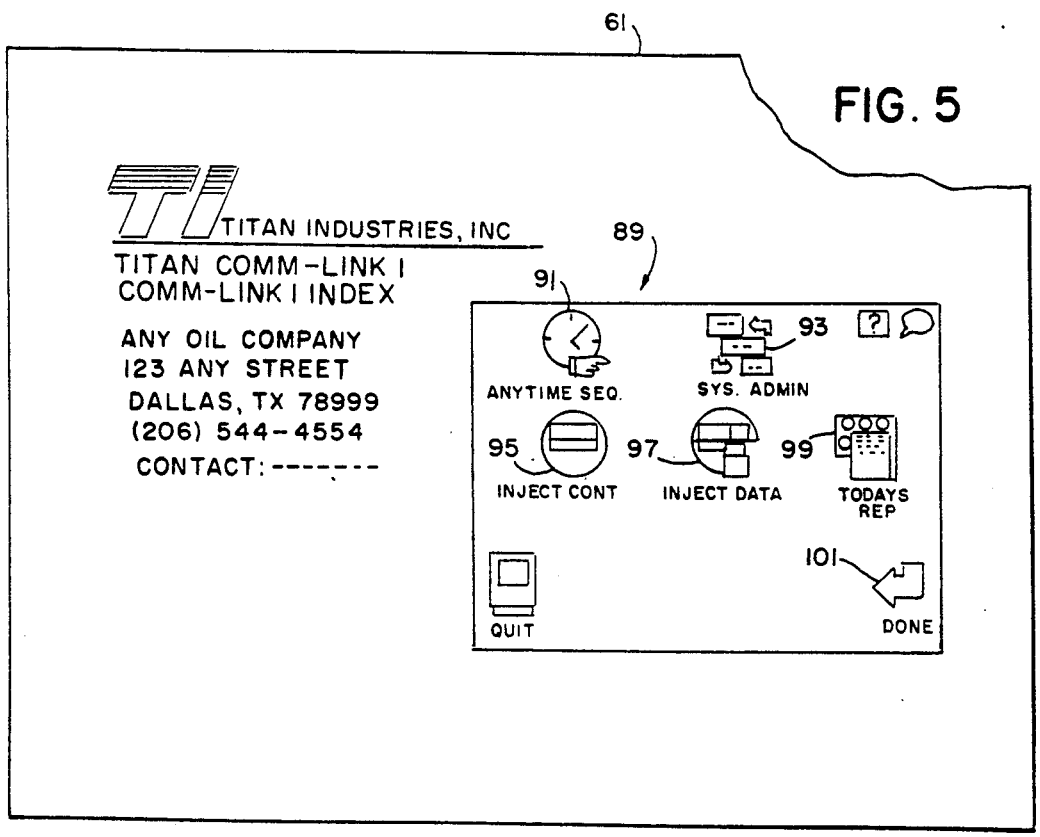
FIG. 5 is a detail of an index screen.

As shown in FIG. 3, the system screen 51 shows a spinning earth 77 or a system-wide geographic graphic, which indicates that the host computer is active. Screen 51 is the first screen a user sees. When the system is idle, with no mouse activity, the system returns to screen 51. Screen 51 goes to a black background after a few revolutions of the earth 77 for computer screen saving. Any time sequencers and modem line monitors are running continually. With the error injector screen 57 displayed, as shown in FIG. 4, the system will continue to monitor the modem for incoming calls from injector error monitoring hardware. If a call is received, the system will inquire about the caller, and particularly the identification of the terminal, and the reason for calling. The system will then automatically query the injectors at the terminal to determine which injector is in error or "HELP" state. The system will audibly announce that error has occurred, and then print a report describing the error. The report is displayed 59, and one may select the arrows 79 with the mouse and the clicker to move up and down on the report. The cursor may be moved into box 81 and positioned on one of the elements either to quit the injector error report to print the report, to require further information and instructions by clicking the mouse after locating the cursor in box 83, to return to the system identification via bubble 85, or to return to the system by locating the cursor in arrow 87 and pushing the clicker. Index screen 61 shown in FIG. 5 is displayed when a return is pushed. Accessing box 89 with the cursor and selecting any time sequencer 91 produces screen 65. Selecting system administration produces a screen for adding new terminals or injectors.

Selecting element 95 selects an injector control screen, and selecting injector data 97 produces a data index. Selecting today's report 99 produces a report screen 67. Return 101 may move back to the main screen or to the injector data screen.

The user controls the entire system from screen 61 and has options to navigate to injector controls, injector data, anytime sequencer, today's report and system administration screens.

When the anytime sequencer screen 65 as shown in FIG. 6 is selected, the system continually monitors the time. If the current time matches an entry in this table, the system performs the desired task, then passes the control back to the user. The user has the ability to control the automatic timing of data acquisition and report printing. Syntax checking for the user is provided for the editable field containing timing information.

Using the cursor, the user may select "sort-by-time" 103 to syntax check by lines 105 or to print the lines 107.

The terminal control has a "get all and archive" button, which appends data to screen 67, as shown in FIG. 7. The data 109 shows the terminal, the injector, the date, time, batch total of the last injection, the additive running grand total, in this case in gallons, the gasoline total, the K factor of the meter and the K factor expressed in different units. The preset A, the status of the injector and another value are also shown. Using the cursor, mouse and clicker in area 111, the user can elect to print the report 113 or clear 115 elements from the report.

Figure 8:
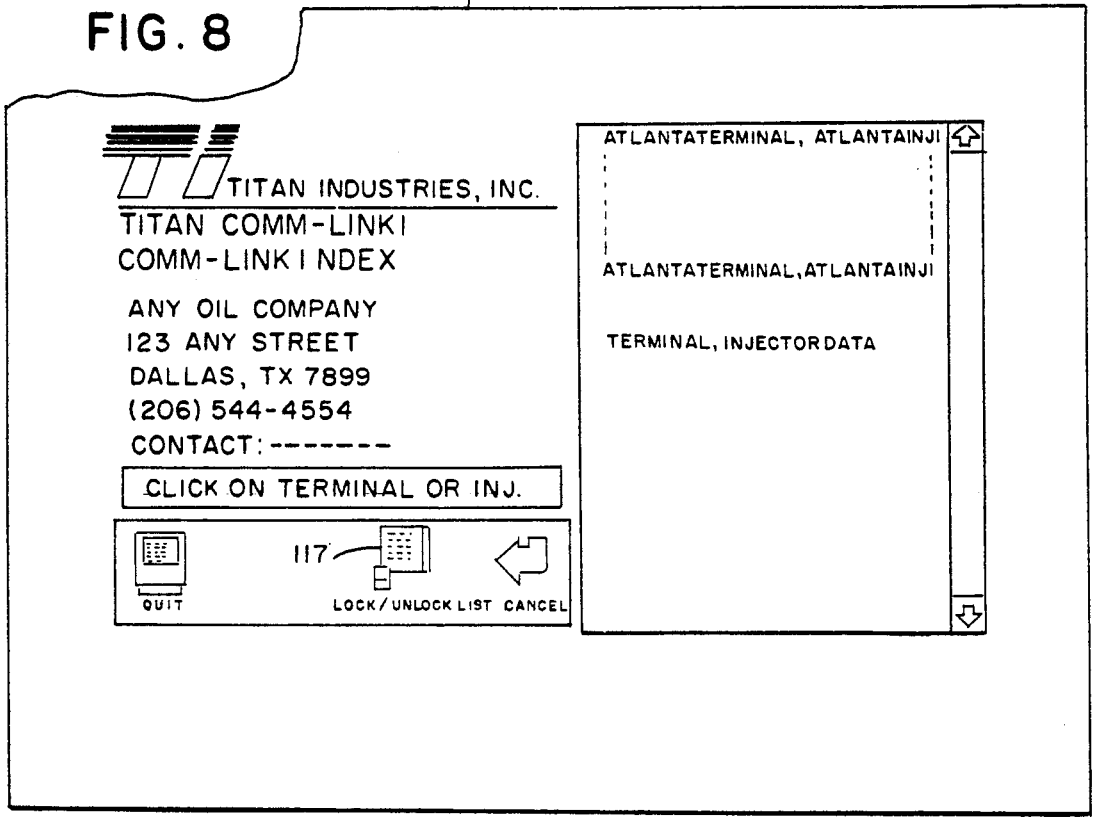
FIG. 8 is a representative example of an injector control index.

Screen 69 shown in FIG. 8 displays the terminals and injector in index form. From this screen the user selects a terminal to control or an injector to view previous injector data. The user can add, modify or delete terminals and/or injectors by locking and unlocking the list 117. If a terminal control screen 71 is selected, the particular lanes and injectors are graphically displayed 119. The user may go on or off hook after placing the cursor in area 121, or may obtain data 123 or modify data 125 to a particular injector, which is selected by locating the cursor in area 119 and clicking the clicker. The user may elect to get all data and archive 127, or simply to get all data 129. The display includes the telephone number and specific injector data for the selected injector 131, and displays the last batch total, the grand total of additive, the gasoline total and the K factors A and B, and the preset A value 133.

Figure 9:
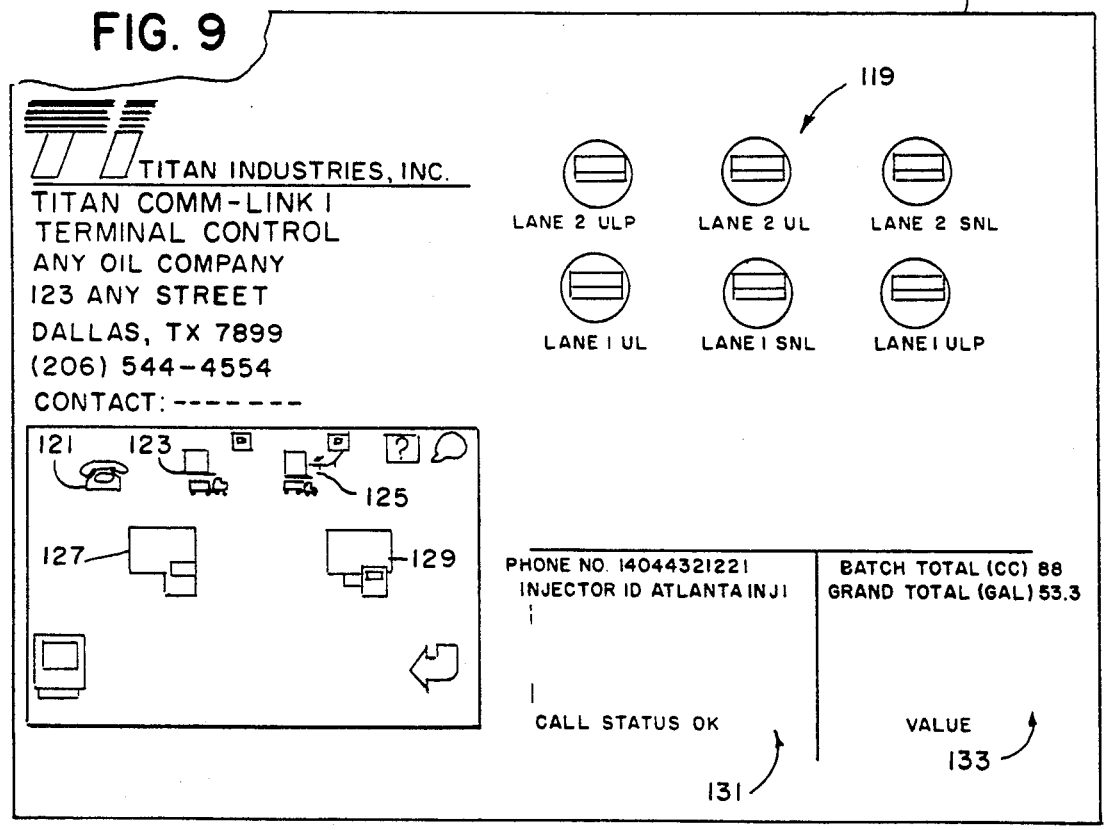
FIG. 9 is a representative example of terminal control.

Screen 71, as shown in FIG. 9, provides the data acquisition brains of the present system. The user can get and put data to individual injectors, and the user can get from all injectors. The user can get data and archive (put into disk) data from all injectors. All modem commands are hidden from the user. If a user requests data, the system automatically dials and remains connected for three minutes. The user can manually go on/off hook by clicking on the telephone button 121. The user can modify an injector's parameters by clicking on the specific injector in area 119, and then typing into the fields located on the bottom right areas 131 or 133, and then clicking on the "put data" button. The "put data" function requires a password to ensure only authorized personnel can modify the injector values.

The user may select a particular injector data screen 73, as shown in FIG. 10, by clicking when the cursor is aligned with the particular injector on the index screen 69. The screen 73 displays all of the information about that injector in area 135. With the injector data screen 73, all the data acquired with the "get all and archive" selection is stored in individual databases based on injector. The particular injector screen 73 may be selected by clicking when the cursor is in area 127 or 129 after clicking the particular injector selected from area 119. By clicking within the area 139, a particular time may be typed in the area 135 and all of the numbers for that last report at that time will be displayed. Clicking within the area 137 provides a function to correct out of time-sequence data points. The same is true from the date selector 139. Area 141 requests the computer to generate an SPC chart 75 for that particular injector.

The SPC chart will end on the data point that is currently displayed on screen 73.

Selecting the arrows 143, 145 or 147 allows the user to return to the first report or to scroll through reports for that particular injector.

FIG. 11 shows an SPC report screen 75, with a part of injector performance showing upper and lower bounds set by the user, in this case ±5%. 89 cc's per command pulse, or per 40 gallons of gasoline, is the target. The vertical lines show actual injections falling below and exceeding that target. The dotted lines indicate a period when no additive was delivered through the particular injector. FIG. 11 shows a printout report for a specific injector. The target amount is 89 cc's per command pulse.

Using the system of the present invention, a major oil company can control its entire terminal, lane and additive injector operation throughout an entire geographic area.

While the invention has been described with reference to specific embodiments, modifications and variations of the invention may be constructed without departing from the scope of the invention, which is defined in the following claims.

We claim:

1. The method of gasoline additive control, comprising establishing communications between a central processor and a remote field additive injector, setting additive quantity per command pulse in the additive injector from the central processor, providing command pulses to the additive injector from a gasoline flowmeter associated with the injector, supplying a predetermined additive quantity from the additive injector to the gasoline flow, storing in the additive injector cumulative quantity of additive added to the gasoline flow, storing in an additive controller cumulative command pulses, periodically interrogating the additive controller from the central processor, periodically supplying data of recorded cumulative additive quantity and cumulative command pulses from the additive injector to the main processor, and periodically printing reports of additive added and gasoline flow at each additive injector.

2. A method of gasoline additive control, comprising establishing communications between a central processor and a remote field additive injector, setting additive quantity per command pulse in the additive injector from the central processor, providing command pulses to the additive injector from a gasoline flowmeter associated with the injector, supplying a predetermined additive quantity from the additive injector to the gasoline flow, storing in the additive injector cumulative quantity of additive added to the gasoline flow, storing in an additive controller cumulative command pulses, periodically interrogating the additive controller from the central processor, periodically supplying data of recorded cumulative additive quantity and cumulative command pulses from the additive injector to the main processor, and periodically printing reports of additive added and gasoline flow at each additive injector, further comprising recording additive quantity per cycle, comparing with predetermined additive quantity per command pulse, and adjusting target additive quantity per command pulse according to difference between actual additive quantity and target additive quantity for each cycle, recording undershoots or overshoots in excess of a predetermined percent of the target quantity, entering alarm state upon predetermined successive error, and reporting alarm state from the additive injector to the central processor.

3. The method of claim 2, wherein the reporting alarm state from the injector to the central processor comprises calling the central processor, receiving an inquiry from the central processor, and reporting alarm status to the central processor.

* * * * *